J. KRONE.
HYDRAULIC PISTON ENGINE.
APPLICATION FILED OCT. 29, 1908.

932,033.

Patented Aug. 24, 1909
3 SHEETS—SHEET 1.

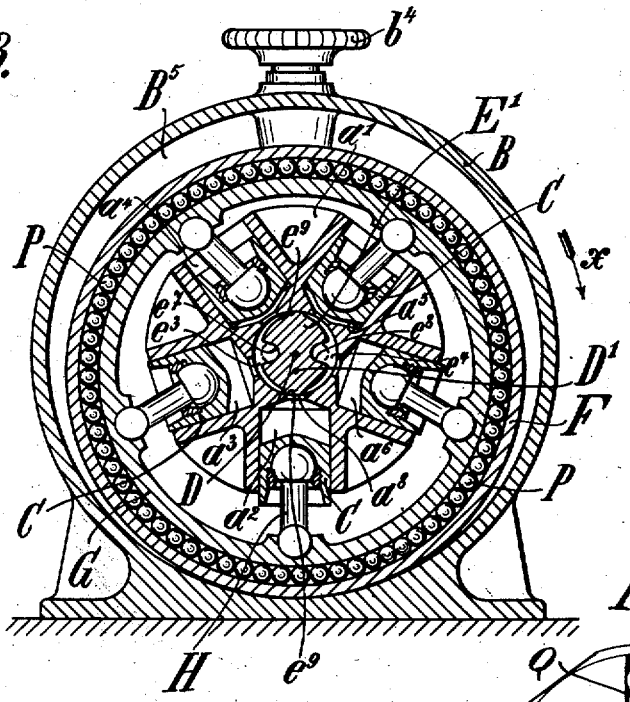

J. KRONE.
HYDRAULIC PISTON ENGINE.
APPLICATION FILED OCT. 29, 1908.

932,033.

Patented Aug. 24, 1909.
3 SHEETS—SHEET 3.

UNITED STATES PATENT OFFICE.

JOHANNES KRONE, OF ESSEN-ON-THE-RUHR, GERMANY, ASSIGNOR TO FRIED. KRUPP AKTIEN-GESELLSCHAFT, OF ESSEN-ON-THE-RUHR, GERMANY.

HYDRAULIC-PISTON ENGINE.

932,033.   Specification of Letters Patent.   Patented Aug. 24, 1909.

Application filed October 29, 1908. Serial No. 460,141.

*To all whom it may concern:*

Be it known that I, JOHANNES KRONE, a subject of the Emperor of Germany, and a resident of Essen-on-the-Ruhr, Germany, have invented certain new and useful Improvements in Hydraulic-Piston Engines, of which the following is a specification.

The present invention relates to piston engines having a plurality of radially and rotatably arranged cylinders, and the object of the invention is, *inter alia*, to adapt this type of piston engines to serve as a fluid variable speed gear consisting of a pump and a motor.

In the accompanying drawings is shown, by way of example a variable speed gear of the kind named.

Figure 1:
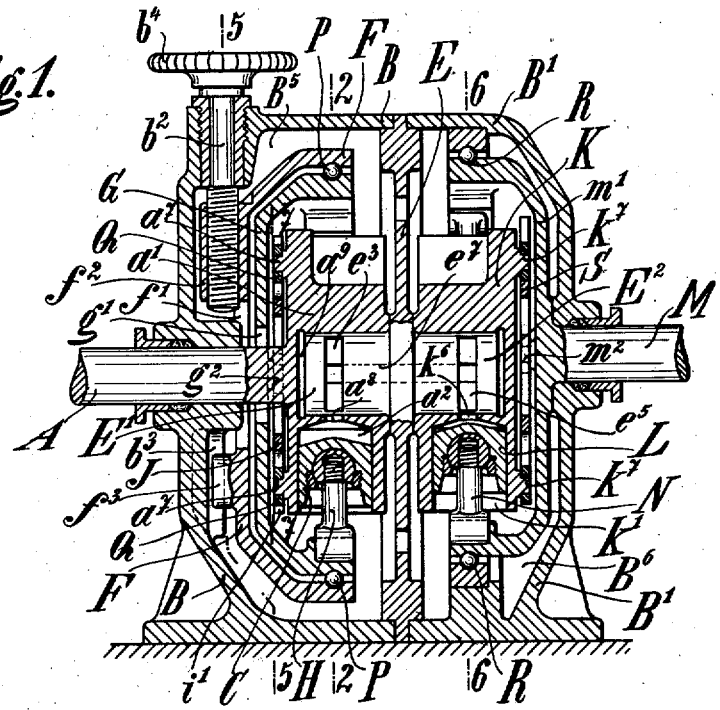
Figure 2:
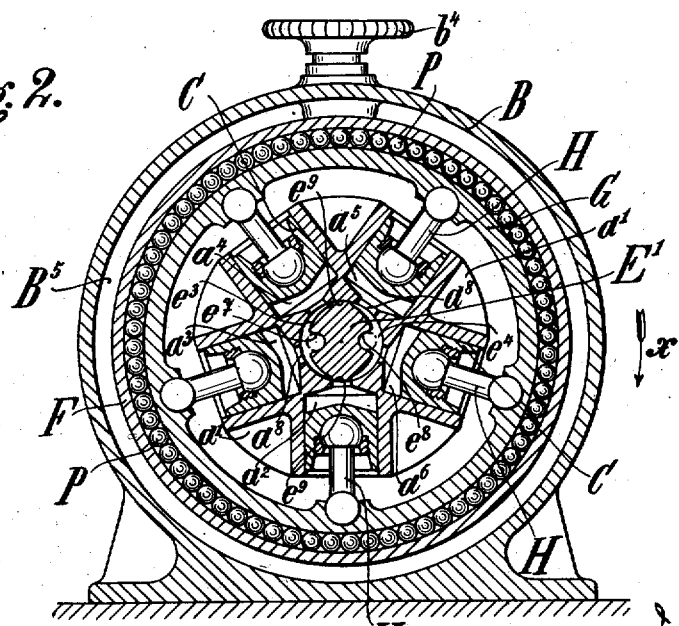
Figure 5:
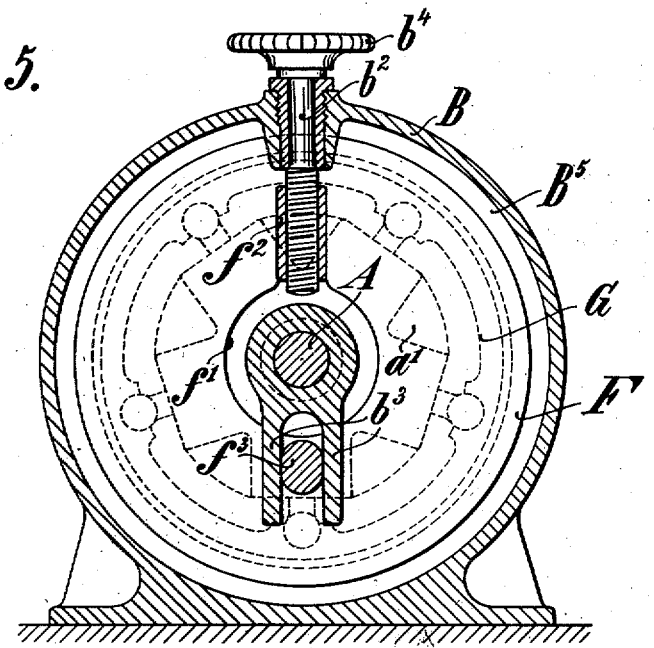
Figure 6:
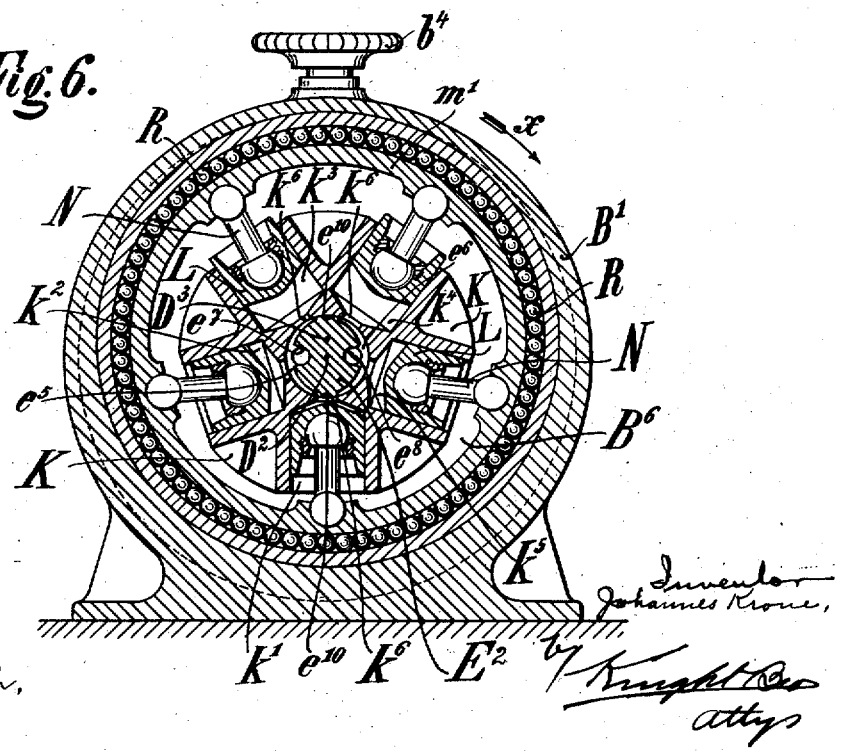

Figure 1 is a longitudinal section through the variable speed gear. Fig. 2 is a section on line 2—2, Fig. 1, looking from the right; Figs. 3 and 4 show the same section as Fig. 2 but show the several parts in different positions; Fig. 5 is a section on line 5—5, Fig. 1, looking from the left, Fig. 6 is a section on line 6—6, Fig. 1, looking from the right, and Fig. 7 is a section on line 7—7, Fig. 1, looking from the left.

A indicates the driving shaft of the variable speed gear. The shaft A is rotatably mounted, in the manner shown in the drawings, in a casing which consists of two parts B and $B^1$. A partition E, which is provided with two central trunnions $E^1$ and $E^2$, divides the casing B $B^1$ into two compartments $B^5$ and $B^6$. The end of the shaft A which projects into the compartment $B^5$ is enlarged to form a block $a^1$ which is provided with a central bore $a^9$ (Fig. 1). The axis of the bore $a^9$ coincides with the axis of the shaft A and the trunnion $E^1$ projects into the bore and tightly closes the bore toward the exterior. The block $a^1$ is provided with five cylindrical bores $a^2$, $a^3$, $a^4$, $a^5$ and $a^6$ (Fig. 2) which are arranged the same angular distance from each other. These bores, in which are guided pistons C, form the working cylinders of the pump of the fluid variable speed gear. On the inside the pump-cylinders $a^2$ to $a^6$ communicate with the bore $a^9$ through the medium of channels $a^8$. Toward the outside the pump-cylinders are closed by the pistons C only; the pump is therefore single-acting and the working chamber of each cylinder is located between the corresponding piston and the axis of rotation of the shaft A.

In addition to the block $a^1$ the compartment $B^5$ of the housing B $B^1$ contains a cup-shaped bearing-member F which is guided on the end-wall of the compartment in a direction perpendicular to the axis of rotation of the shaft A. To that end the end-wall of the compartment $B^5$ is provided with two rails $b^3$ (Figs. 1 and 5) between which is guided a guide-piece $f^3$ arranged on the bearing-member F.

The member F is provided with a central perforation $f^1$ (Figs. 1 and 5) for the passage of the shaft A. The bearing-member can be adjusted through the medium of a screw $b^2$ which is provided with a hand-wheel $b^4$ and which is rotatably but non-slidably mounted in the casing-part B, the screw engaging in a projection $f^2$ located on the bearing-member F and provided with corresponding internal threads. A member G, which is also cup-shaped, is rotatably mounted in the cup-shaped member F through the medium of balls P. The member G is provided with a central perforation $g^1$ (see Fig. 1) for the passage of the shaft A. When the bearing member F is in the position shown in Fig. 2 the axis of rotation of the member G coincides with the axis of rotation of the shaft A. From this position the axis of rotation of the member G, which in Figs. 3 and 4 is projected in the point $D^1$, can be adjusted both upwardly and downwardly by suitably turning the screw $b^2$. Fig. 3 shows the members F and G in the position which they assume when the axis of rotation of the member G is in its lowermost position and Fig. 4 shows the position in which the axis of rotation of the member G is in its uppermost position. The distance which, in any position of the bearing-member F, the axis of rotation of the member G has from the axis of rotation of the shaft A, which in Figs. 3 and 4 is projected in the point D, will in the following be termed the eccentricity of the pump.

The member G and the block $a^1$ are connected to each other by means of an Oldham coupling. The coupling consists in the known manner of a disk J (Figs. 1 and 7) which is provided with four guide-slots $i^1$ and $i^2$ spaced apart an angular distance of 90°, a pair of pins $a^7$ on the block $a^1$ which are guided by means of rollers Q in the diametrically oppositely located slots $i^1$, and a pair of pins $g^2$ on the member G, which are guided by means of rollers $Q^1$ in the slots $i^2$ which are located diametrically opposite in the disk J. By reason of the known properties of the Oldham coupling the member G must, when the shaft A is rotated, turn in the same direction and at the same angular velocity as the shaft A, irrespective of to what eccentricity the pump is adjusted.

To the member G are jointed the outer ends of piston-rods H, which have their inner ends connected to the pistons C in the manner shown in the drawings. When the axes of rotation of the member G and shaft A coincide, as shown in Fig. 2, the axes of the piston-rods H coincide with the axes of the pump-cylinders $a^2$ to $a^6$.

The motor of the fluid variable speed gear, which motor is arranged in the casing-chamber $B^6$, is formed in the same manner as the pump. The motor is also provided with five working cylinders ($k^1$, $k^2$, $k^3$, $k^4$ and $k^5$) which are arranged radially and the same angular distance apart in a block K which is rotatably mounted on the trunnion $E^2$. The motor-cylinders $k^1$ to $k^5$, which are of the same diameter as the pump-cylinders $a^2$ to $a^6$, communicate, by means of channels $k^6$ (see especially Fig. 6), with the bore in the block K receiving the trunnion $E^2$.

M indicates the driven shaft of the variable speed gear. The shaft M is journaled in the casing-part $B^1$ in the manner shown in the drawings (see especially Fig. 1), the shaft being mounted in such a manner that its axis, which in Fig. 6 is projected in the point $D^3$, extends parallel to the axis of rotation of the block K which in Fig. 6 is projected in the point $D^2$. The distance $D^2$ $D^3$ between the two axes, which distance is equal to the greatest eccentricity of the pump (see Figs. 3 and 4), will in the following be termed the eccentricity of the motor. The eccentricity of the motor is non-variable as contradistinct from the eccentricity of the pump. The end of the shaft M which projects into the casing-chamber $B^6$ is enlarged to form a cup-shaped member $m^1$ which is rotatably mounted in the casing-part $B^1$ through the medium of balls R. The cup-shaped member $m^1$ is connected with the block K by means of an Oldham coupling S $k^7$ $m^2$ (Fig. 1) which is constructed in the same manner as the coupling J $a^7$ $g^2$ of the pump. To the member $m^1$ are jointed the outer ends of piston-rods N which, in the manner shown in the drawings, have their inner ends connected to pistons L which are guided in the motor-cylinders $k^1$ to $k^5$ (see Figs. 1 and 6).

A rotary controlling valve serves for controlling the pump and the motor. The controlling valve is formed in the following manner: The stationary trunnion $E^1$ forms the common cut-off member for the pump-cylinders and the trunnion $E^2$ forms the common cut-off member for the motor-cylinders. The trunnions $E^1$ and $E^2$ are provided with two grooves which are of such formation that two crescent-shaped hollow spaces $e^3$ $e^4$ and $e^5$ $e^6$ (see especially Figs. 2 to 4 and Fig. 6) are formed between the trunnions and the walls of the bores in the blocks $a^1$ and K which contain the trunnions. The hollow spaces $e^3$ and $e^5$ communicate with each other through the medium of a channel $e^7$ located in the interior of the trunnions and the hollow spaces $e^4$ and $e^6$ communicate with each other through the medium of a channel $e^8$ which is also located in the interior of the trunnions. The hollow spaces $e^3$ and $e^4$, which when the block $a^1$ is rotated can enter into communication with all the pump-cylinders through the channels $a^8$, are separated from each other by two ribs $e^9$ (Figs. 2 and 4). The hollow spaces $e^5$ and $e^6$, which when the block K is rotated can enter into communication with all the motor-cylinders through the channels $k^6$, are separated from each other by two ribs $e^{10}$ (Fig. 6). The ribs $e^9$ are arranged in such a manner that they are divided into two symmetrical halves by the plane in which the axis of rotation of the member G can be shifted. The ribs $e^{10}$ are also divided into two symmetrical halves by the plane in which the axes of rotation of the block K and shaft M are located. Measured in the direction of the circumference of the trunnions $E^1$ and $E^2$ the ribs $e^9$ and $e^{10}$ are of the same width as the channels $a^8$ and $k^6$. The location of the channels $a^8$ and $k^6$ is selected in such a manner that the channels are entirely closed by the ribs $e^9$ or $e^{10}$ when the axis of the appurtenant cylinder lies in the symmetry-plane of the ribs.

When the fluid variable speed gear is in condition ready to be set in operation the working chambers of the pump and of the motor are filled with a suitable fluid, such as oil, the hollow spaces of the valve being also filled with the fluid. It is preferable to also fill the chambers $B^5$ and $B^6$ with oil. The means for filling the chambers and spaces with the fluid are not shown in the drawings.

During the operation of the variable speed gear the shaft A is driven in a suitable manner, for instance in the direction of the arrow $x$ (Figs. 2 to 4) by a suitable source of power, such as an electromotor rotating in the same direction and at constant speed. If the pump is adjusted to an eccentricity of nil (Fig. 2) the block $a^1$ and the member G then rotate in the same direction and at the same angular velocity about the same axis, that is they move as if they were integral with each other. There can therefore be no movement of the pump-pistons relative to their cylinders. Consequently there is no circulation of fluid from the pump to the motor, and the motor and its shaft M therefore remain at rest. If the shaft M is to be caused to rotate the pump must be adjusted to an eccentricity other than *nil*, this being done by turning the screw $b^2$ to shift the members F and G. If the axis of rotation $D^1$ of the member G lies below the axis of rotation D of the shaft A, as shown in Fig. 3, and the shaft A is rotated in the direction of the arrow $x$ it is apparent that the pistons of those pump-cylinders, which for the time being are in communication with the hollow spaces $e^3$ (in Fig. 3 the cylinders $a^3 a^4$), will move inwardly and force fluid into the hollow space $e^3$.

The pistons of those cylinders which communicate with the hollow space $e^4$ (in Fig. 3 the cylinders $a^5 a^6$) move outwardly and draw fluid out from the space $e^4$. In this case the hollow space $e^3$ therefore forms the pressure-chamber of the pump and the hollow chamber $e^4$ forms the suction-chamber of the pump. In each cylinder the alternation between pressing action and suction-action takes place when the axis of the cylinder passes through the symmetry-plane of the ribs $e^9$. If the cylinder in such case is situated below the axis of the shaft A the appurtenant piston is, as shown in the figure, in its outer dead position, and if the cylinder is situated above the axis of the shaft A the appurtenant piston is in its inner dead position. It is also apparent that the stroke of the piston is equal to twice the eccentricity of the pump. As the hollow space $e^5$, which is located on the motor-side (Fig. 6), communicates with the hollow space $e^3$ through the channel $e^7$ the fluid in the space $e^3$ is subjected to pressure while the fluid in the hollow space $e^6$, which communicates with the hollow space $e^4$ by the channel $e^8$ is subjected to suction. In those motor-cylinders ($k^2$ and $k^3$ in Fig. 6) which communicate with the hollow space $e^5$, which is under pressure, forces are therefore exerted on the pistons L which tend to drive the pistons outwardly, while no forces worth mentioning act on the pistons L of those motor-cylinders which communicate with the hollow chamber $e^6$ which is under suction. The block K and the shaft M, which is coupled to the block, must therefore rotate and the rotation can only take place in the direction of the arrow $x$ (Fig. 6) as it is evident that only this direction of rotation will permit an outward movement of the pistons L in the motor-cylinders which communicate with the hollow space $e^5$.

If the hand-wheel $b^4$ is turned to adjust the members according to Fig. 4 in such a manner that the axis of rotation $D^1$ of the member G is situated above the axis D of the shaft A the pistons of those cylinders (the cylinders $a^5 a^6$ in Fig. 4), which for the time being communicate with the hollow space $e^4$, move inwardly and the pistons of those cylinders which communicate with the hollow space $e^3$ move outwardly. In this instance the hollow space $e^4$ therefore forms the pressure-chamber and the hollow space $e^3$ forms the suction-chamber of the pump. Of the two hollow spaces $e^5$ and $e^6$ (Fig. 6) located on the motor-side the hollow space $e^6$ is therefore now under pressure and the hollow space $e^5$ is under suction. In this instance the pistons L of those motor-cylinders, which communicate with the hollow space $e^6$, are driven outwardly. The motor and the shaft M driven by the motor must therefore now turn in the direction opposite to the arrow $x$, (Fig. 6) as it is apparent that only this direction of rotation will permit an outward movement of the pistons of the motor cylinders which communicate with the hollow space $e^6$.

As the motor and the pump are of identical construction the statements made with regard to the amount of movement of the pump-pistons C equally apply to the motor-pistons L, that is the motor-pistons make a stroke which is equal to twice the eccentricity of the motor, and the motor-pistons are in one of their dead positions when the axis of the appurtenant cylinder passes through the symmetry plane of the ribs $e^{10}$.

In the mode of operation as described in the foregoing the amount of the ratio of transmission between the driving shaft A and the driven shaft M has not been fully considered. The ratio of transmission can easily be calculated when it is taken in consideration that the motor always runs so rapidly that it exactly consumes the amount of fluid fed to the motor by the pump. If the hand-wheel $b^4$ is turned to adjust the pump in such a manner that its eccentricity for instance is equal to the eccentricity of the motor the length of stroke of the pump-pistons C is equal to the length of stroke of the motor-pistons L. As furthermore the pump-cylinders and the motor-cylinders are of the same diameter the motor is only capable of taking up the entire amount of fluid fed thereto by the pump if the motor rotates at the same speed as the pump. When the pump is adjusted as shown in Figs. 3 and 4 the shafts A and M therefore rotate at the same speed in one direction or the other. If the eccentricity of the pump is decreased the stroke of the pump-pistons C becomes smaller as does also the amount of fluid fed to the motor by the pump in the time-unit. As the speed of the motor is directly proportioned to the amount of fluid fed to the motor in the time-unit the speed of the motor also becomes less; as already mentioned the speed of the motor becomes *nil* when the pump is adjusted to an eccentricity of *nil* (see Fig. 2.)

The described variable speed gear therefore makes it possible to transmit motion in one direction or the other from a shaft (A), which turns in the same direction and at constant speed, to another shaft (M) with any desired ratio of transmission between the limits O and I. The variable speed gear may of course be constructed in such a manner that it can be adjusted to a ratio of transmission in excess of 1. To that end it is merely necessary to select the construction in such a manner that the eccentricity of the pump may be made greater than the eccentricity of the motor.

Having thus described the invention, what is claimed and desired to be secured by Letters Patent is:

1. A piston-engine comprising a rotatably mounted member, a plurality of cylinders arranged radially in said member to rotate therewith, a piston in each of said cylinders, a second member mounted to rotate about an axis parallel to the axis of rotation of the cylinders, a piston rod for each of said pistons having one end connected to the piston and having its other end jointed to said second member, means coupling said second member to the member containing the cylinders to cause said members to rotate in the same direction and at the same speed, and means for adjusting said second member to vary the distance between the axis of rotation of the second member and the axis of rotation of the cylinders.

2. A fluid variable speed gear consisting of a pump and a motor, each comprising a rotatably mounted member, a plurality of cylinders arranged radially in said member to rotate therewith, a piston in each of said cylinders, a second member mounted to rotate about an axis parallel to the axis of rotation of the cylinders, a piston rod for each of said pistons having one end connected to the piston and having its other end jointed to said second member and means coupling the second member to the member containing the cylinders to cause said members to rotate in the same direction and at the same speed; and means for adjusting the second member of the pump to vary the distance between the axis of rotation of said member and the axis of rotation of the pump-cylinders, the distance between the axis of rotation of the second member of the motor and the axis of rotation of the motor-cylinders remaining constant.

3. A fluid variable speed gear consisting of a single-acting pump and a single-acting motor, each comprising a rotatably mounted member, a plurality of cylinders arranged radially in said member to rotate therewith, a piston in each of said cylinders, a second member mounted to rotate about an axis parallel to the axis of rotation of the cylinders, a piston rod for each of said pistons having one end connected to the pistons and its other end jointed to said second member, means coupling the second member to the member containing the cylinders and causing said members to rotate in the same direction and at the same speed, and means for adjusting the second member of the pump to vary the distance between the axis of rotation of said member and the axis of rotation of the pump-cylinders; each of the pump-cylinders and of the motor-cylinders having its working chamber located between the piston of the cylinder and the axis of rotation of the cylinder.

The foregoing specification signed at Barmen, Germany, this 1st day of October, 1908.

JOHANNES KRONE. [L. S.]

In presence of—
 OTTO KÖNIG,
 WM. WASHINGTON BRUNSWICK.